United States Patent
Jitsukawa

(10) Patent No.: US 9,876,551 B2
(45) Date of Patent: Jan. 23, 2018

(54) MOBILE STATION AND REPORTING METHOD

(71) Applicant: FUJITSU LIMITED, Kawasaki-shi, Kanagawa (JP)

(72) Inventor: Daisuke Jitsukawa, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 130 days.

(21) Appl. No.: 14/936,171

(22) Filed: Nov. 9, 2015

(65) Prior Publication Data
US 2016/0065291 A1    Mar. 3, 2016

Related U.S. Application Data

(63) Continuation of application No. PCT/JP2013/063088, filed on May 9, 2013.

(51) Int. Cl.
H04W 4/00 (2009.01)
H04B 7/06 (2006.01)
(Continued)

(52) U.S. Cl.
CPC ......... *H04B 7/0626* (2013.01); *H04B 7/0417* (2013.01); *H04B 7/0469* (2013.01);
(Continued)

(58) Field of Classification Search
None
See application file for complete search history.

(56) References Cited

U.S. PATENT DOCUMENTS 9,344,170 B2 *   5/2016  Shirani-Mehr ...... H04B 7/0469
9,497,002 B2 * 11/2016  Wei .................... H04B 7/0456
(Continued)

FOREIGN PATENT DOCUMENTS

EP    2 950 458 A1    12/2015

OTHER PUBLICATIONS

Samsung, "Discussion on scenarios for elevation beamforming and FD-MIMO", Agenda Item: 7.3.6.1, 3GPP TSG RAN WG1 Meeting #72, R1-130302, St. Julian's, Malta, Jan. 28-Feb. 1, 2012.
(Continued)

*Primary Examiner* — Michael J Moore, Jr.
(74) *Attorney, Agent, or Firm* — Myers Wolin, LLC

(57) ABSTRACT

A mobile station reports, based on a known signal transmitted from a base station, channel state information to the base station and performs wireless communication with the base station by spatial multiplexing. The mobile station includes: a calculating unit that calculates first precoding information corresponding to first channel state information and used in horizontal direction beam formation in the base station, second precoding information corresponding to second channel state information, and third precoding information corresponding to both of the first channel state information and the second channel state information and used in vertical direction beam formation in the base station; and a report control unit that reports the first precoding information and the third precoding information in reporting the first channel state information, and reports the second precoding information without reporting the third precoding information in reporting the second channel state information.

7 Claims, 7 Drawing Sheets

(51) Int. Cl.
| | |
|---|---|
| H04W 24/10 | (2009.01) |
| H04B 7/0417 | (2017.01) |
| H04B 7/04 | (2017.01) |
| H04W 72/12 | (2009.01) |

(52) U.S. Cl.
 CPC ......... *H04B 7/0617* (2013.01); *H04B 7/0632* (2013.01); *H04B 7/0639* (2013.01); *H04W 24/10* (2013.01); *H04W 72/12* (2013.01)

(56) References Cited

U.S. PATENT DOCUMENTS

| | | | |
|---|---|---|---|
| 9,768,849 B2* | 9/2017 | Ko | H04B 7/0626 |
| 2011/0249712 A1 | 10/2011 | Hammarwall et al. | |
| 2012/0299774 A1 | 11/2012 | Oyama | |
| 2015/0016379 A1* | 1/2015 | Nam | H04B 7/0456 370/329 |
| 2015/0078472 A1* | 3/2015 | Vook | H04B 7/0617 375/267 |
| 2015/0358059 A1* | 12/2015 | Kim | H04B 7/0456 370/329 |
| 2015/0372733 A1* | 12/2015 | Kim | H04B 7/0456 375/267 |
| 2016/0050003 A1* | 2/2016 | Ko | H04B 7/0469 370/329 |
| 2016/0087708 A1* | 3/2016 | Kang | H04B 7/0619 370/312 |
| 2017/0208613 A1* | 7/2017 | Nam | H04W 72/1226 |

OTHER PUBLICATIONS

3GPP, "Study on 3D-channel model for Elevation Beamforming and FD-MIMO studies for LTE" TSG-RAN, RP-122034, Barcelona, Spain, Dec. 4-7, 2012.
Alcatel-Lucent Shanghai Bell et al.,"Considerations on CSI feedback enhancements for high-priority antenna configurations", Agenda Item: 6.6.2.1, 3GPP TSG-RAN WG1 Meeting #66, R1-112420, Athens, Greece, Aug. 22-26, 2011.
NTT DOCOMO,"Scenarios for UE-Specific Elevation Beamforming and FD-MIMO" Agenda Item: 7.2.6.1, 3GPP TSG RAN WG1 Meeting #72bis, R1-131428, Chicago, USA, Apr. 15-19, 2013.
Kishiyama et al.,"Future steps of LTE-A: Evolution Toward Integration of Local Area and Wide Area Systems" IEEE Wireless Communications Magazine, vol. 20, Issue:1, Feb. 2013, pp. 12-18.
Samsung, "Technologies for Rel-12 and onwards" 3GPP TSG-RAN Workshop on Rel-12 and Onwards, RWS-120046, Ljubljana, Slovenia, Jun. 11-12, 2012.
International Search Report issued for corresponding International Patent Application PCT/JP2013/063088, dated Jul. 2, 2013, with an English translation.
Extended European search report with the supplementary European search report and the European search opinion issued for corresponding European Patent Application No. 13884352.9 dated Apr. 14, 2016.
Notice of Preliminary Rejection issued by the Korean Intellectual Property Office for corresponding Korean Patent Application No. 10-2015-7032041, dated Mar. 3, 2017, with English translation.
Lindskog et al., "IEEE 802.16 Broadband Wireless Access Working Group <http://ieee802.org/16> Closed Loop MIMO Precoding", IEEE 802.16e-04/293r2, Nov. 4, 2004.
Thomas et al., "Transparent User-Specific 3D MIMO in FDD Using Beamspace Methods", Global communications Conference, Wireless Communications Symposium, Dec. 3-7, 2012, pp. 4618-4623.
Du et al., "Evaluation of PMI Feedback Schemes for MU-MIMO Pairing", IEEE Systems Journal, vol. 4, No. 4, Dec. 2010, pp. 505-510.
Second notice of Preliminary Rejection issued by the Korean Intellectual Property Office for corresponding Korean Patent Application No. 10-2015-7032041, dated May 31, 2017, with English translation.

* cited by examiner $$W = \begin{bmatrix} W_1 \\ W_2 \\ W_3 \\ W_4 \\ W_5 \\ W_6 \\ W_7 \\ W_8 \\ \cdots \\ W_{13} \\ W_{14} \\ W_{15} \\ W_{16} \end{bmatrix} = \begin{bmatrix} W_{v1}\begin{bmatrix} W_{h1} \\ W_{h2} \\ W_{h3} \\ W_{h4} \end{bmatrix} \\ W_{v2}\begin{bmatrix} W_{h1} \\ W_{h2} \\ W_{h3} \\ W_{h4} \end{bmatrix} \\ \cdots \\ W_{v4}\begin{bmatrix} W_{h1} \\ W_{h2} \\ W_{h3} \\ W_{h4} \end{bmatrix} \end{bmatrix}$$

MOBILE STATION AND REPORTING METHOD

CROSS-REFERENCE TO RELATED APPLICATION

This application is a continuation application of International Application PCT/JP2013/063088, filed on May 9, 2013, and designating the U.S., the entire contents of which are incorporated herein by reference.

FIELD

The present invention relates to a mobile station and a reporting method.

BACKGROUND

Conventionally, in a wireless communication system, to which Long Term Evolution (LTE) is applied, a communication control procedure, called closed-loop precoding, is used for a down link (DL). A down link is a line directed from a base station (eNB: eNodeB) to a mobile station (UE: user equipment). In closed-loop precoding, a base station forms directional beams by using a plurality of antennas (that is, multiple antennas). Further, in closed-loop precoding, spatial multiplexing, by which data streams are simultaneously transmitted, may be used together with rank adaptation, by which the number (transmission rank) of the spatially multiplexed data streams (spatial layer) is adaptively controlled. The mobile station selects the optimum precoding matrix from a precoding codebook prescribed for each rank and feeds back (reports) the selection to the base station. The precoding codebook includes at least one precoding matrix.

Specifically, in closed-loop precoding, the mobile station feeds back channel state information (CSI) indicating a channel state to the base station. The CSI includes a rank indicator (RI) indicating a recommended communication rank (transmission rank), a precoding matrix indicator (PMI) indicating a recommended precoding matrix, and a channel quality indicator (CQI) indicating a wireless channel quality in a case where the RI and PMI are assumed. When the CSI is received from the mobile station, the base station determines, based on the RI and PMI, a precoding matrix. The base station then transmits, to the mobile station, reference signals specific to each mobile station (that is, UE-specific reference signals (RS)) and a shared channel (for example, a physical downlink shared channel (PDSCH)), to which the determined precoding matrix has been applied. The mobile station demodulates the PDSCH by using a channel estimate value based on the UE-specific RS.

As described above, a conventional method of feeding back a CSI supposes PDSCH transmission, to which single user-multiple input multiple output (SU-MIMO) is applied, the SU-MIMO being a spatial multiplexing technique for a signal to a single mobile station. That is, it is supposed that reliability is ensured by retransmission control. Therefore, the base station considers transmission efficiency for the single mobile station to be important, and selects a rank corresponding to the wireless channel quality and a precoding matrix corresponding to the rank.

Further, for LTE, a technique called three-dimensional MIMO (3D-MIMO) has started to be studied. In 3D-MIMO, antennas that are two-dimensionally arranged, that is, multiple antennas arranged in a two-dimensional array, are used. In 3D-MIMO, by use of the antennas two-dimensionally arranged, directional beams in a horizontal direction and directional beams in a vertical direction are formed. Several methods of utilizing the directional beams in the horizontal direction and the directional beams in the vertical direction have been proposed. For example, a utilization method has been proposed, in which a conventional fixed sector in a horizontal direction is adaptively divided in an elevation angle direction, by use of a directional beam in a vertical direction. According to this proposal, by dividing a cell into many sectors, communication capacity of the whole system is able to be increased. Further, a utilization method has been proposed, in which a signal is transmitted, by use of a directional beam in a vertical direction, to each of mobile stations that are present at different heights, for example, to each of mobile stations that are present on different floors in a building. By this utilization method, communication characteristics of each of the mobile stations are improved, and interference among communication of the different mobile stations is able to be alleviated.

Non-Patent Document 1: IEEE 802.16 Broadband Wireless Access Working Group Closed Loop MIMO Precoding (Apr. 11, 2004)

Non-Patent Document 2: 3GPP TSG-RAN WG1, R1-130302, "Discussion on scenarios for elevation beamforming and FD-MIMO," January 2012

Non-Patent Document 3: 3GPP TSG-RAN, RP-122034, "Study on 3D-channel model for Elevation Beamforming and FD-MIMO studies for LTE," December 2012

In recent years, a technique has been developed, which is for dynamically switching over between the above described SU-MIMO and multiple user-multiple input multiple output (MU-MIMO), which is a spatial multiplexing technique for a signal to a plurality of mobile stations. Further, a technique is in the process of being developed, which is for applying closed-loop precoding to an enhanced physical downlink control channel (EPDCCH), which is a control channel compatible with frequency multiplexing, in addition to conventional time multiplexing. Therefore, in order to be compatible with these techniques, enhancement of a method of feeding back CSI from a mobile station to a base station has been desired.

As a new method feeding back CSI, a method of feeding back multiple CSI processes has been proposed, for example. In this method of feeding back multiple CSI processes, limitation related to a subset of codebooks is added for each CSI process. A mobile station feeds back CSI from a range of RI and PMI limited according to a bitmap indicated by an upper layer. In an application example, a mobile station feeds back CSI supposing SU-MIMO of a recommended rank of a connected cell in a CSI process 1. Further, the mobile station feeds back CSI supposing MU-MIMO and an EPDCCH of a rank 1 of the connected cell in a CSI process 2.

In this manner, by the above described method of feeding back CSI, system performance is improved. However, for a single cell, the mobile station transmits CSI of a size (for example, 12 bits) that is twice the size for that of the conventional one, to the base station. Accordingly, overhead of control information transmitted to the base station when the mobile station feeds back the CSI is largely increased.

Moreover, when 3D-MIMO is introduced, the size of the CSI may be increased further, and the overhead of the control information may be largely increased even further.

SUMMARY

According to an aspect of the embodiments, a mobile station reports, based on a known signal transmitted from a base station, channel state information to the base station and performs wireless communication with the base station by spatial multiplexing. The mobile station includes: a calculating unit that calculates first precoding information corresponding to first channel state information and used in horizontal direction beam formation in the base station, second precoding information corresponding to second channel state information, and third precoding information corresponding to both of the first channel state information and the second channel state information and used in vertical direction beam formation in the base station; and a report control unit that reports the first precoding information and the third precoding information in reporting the first channel state information, and reports the second precoding information without reporting the third precoding information in reporting the second channel state information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments of a mobile station and a reporting method disclosed by the present application will be described in detail, based on the drawings. The mobile station and reporting method disclosed by the present application are not limited by these embodiments. Further, in the embodiments, the same signs will be appended to configurations having the same functions, and redundant description thereof will be omitted.

[First Embodiment]
[Example of Configuration of Mobile Station]

Figure 1:
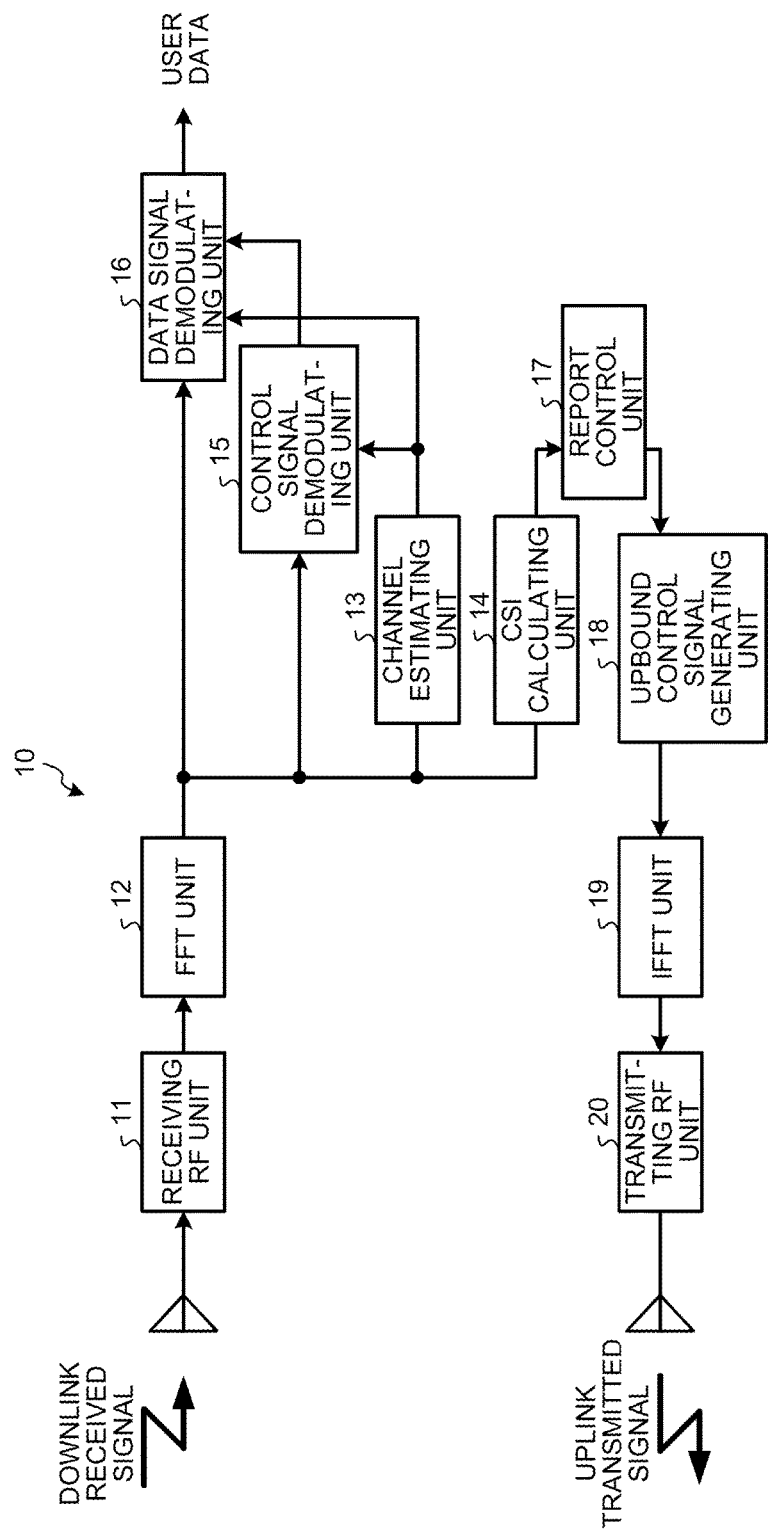
FIG. 1 is a block diagram illustrating an example of a mobile station of a first embodiment.
Figure 2:
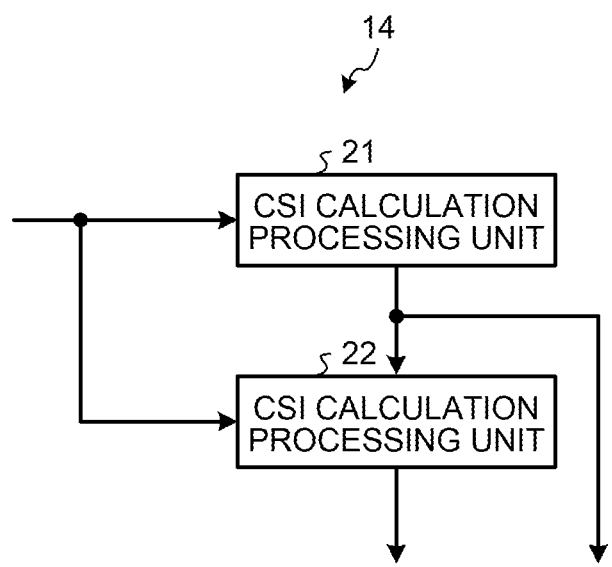
FIG. 2 is a block diagram illustrating an example of a CSI calculating unit of the first embodiment.

FIG. 1 is a block diagram illustrating an example of a mobile station of a first embodiment. In FIG. 1, a mobile station 10 has a receiving radio frequency (RF) unit 11, a fast Fourier transform (FFT) unit 12, a channel estimating unit 13, a CSI calculating unit 14, a control signal demodulating unit 15, a data signal demodulating unit 16, a report control unit 17, an uplink control signal generating unit 18, an inversed fast Fourier transform unit (IFFT) 19, and a transmitting RF unit 20. The mobile station 10 has a plurality of antennas (not illustrated). The CSI calculating unit 14 has, as illustrated in FIG. 2, CSI calculation processing units 21 and 22. FIG. 2 is a block diagram illustrating an example of the CSI calculating unit of the first embodiment. Each of these units is connected to be able to input and output signals and data unidirectionally or bidirectionally.

The receiving RF unit 11 performs conversion from a radio frequency to a base band, quadrature demodulation, and analog to digital (A/D) conversion, with respect to a signal received from a later described base station 30.

The FFT unit 12 performs detection of an FFT timing, removal of a cyclic prefix (CP), and FFT processing, with respect to a signal received from the receiving RF unit 11.

The channel estimating unit 13 extracts, from a received signal that has been FFT processed, a UE-specific RS, which is a reference signal for data demodulation. Further, the channel estimating unit 13 calculates a channel estimate value from cross-correlation between the extracted UE-specific RS and a known reference signal.

The control signal demodulating unit 15 extracts a control signal from a received signal that has been FFT processed and performs channel compensation by using the above mentioned channel estimate value. Further, the control signal demodulating unit 15 restores transmission format information, such as a transmission rank to be applied, as control information, by performing data demodulation and error correction decoding.

The data signal demodulating unit 16 extracts a data signal from a received signal that has been FFT processed, and performs channel compensation by using the above mentioned channel estimate value. Further, the data signal demodulating unit 16 restores information bits by performing, based on the above mentioned transmission format information, data demodulation and error correction decoding.

The CSI calculating unit 14 extracts channel state information-reference signals (CSI-RS), which are reference signals for channel quality measurement, from a received signal that has been FFT processed.

Further, the CSI calculating unit 14 calculates, from cross-correlation between the extracted CSI-RS and a known reference signal, a channel estimate value, which is a wireless channel distortion expressed by a complex number.

Furthermore, the CSI calculating unit 14 calculates first channel state information, that is, first CSI, and second channel state information, that is, second CSI, by using the calculated channel estimate value. That is, in the CSI calculating unit 14, the CSI calculation processing unit 21 calculates the first channel state information and the CSI calculation processing unit 22 calculates the second channel state information.

For example, the CSI calculation processing unit 21 determines a communication rank for SU-MIMO and a precoding matrix for SU-MIMO, by using the calculated channel estimate value. The precoding matrix for SU-MIMO determined here includes a first horizontal component precoding matrix used in horizontal direction beam formation in the later described base station 30 and a vertical component precoding matrix used in vertical direction beam formation therein.

The CSI calculation processing unit 21 determines, based on the determined communication rank for SU-MIMO and precoding matrix for SU-MIMO, an RI and a PMI (a $PMI_V$ and a $PMI_H$). Herein, a $PMI_V$ is a PMI determined based on the vertical component precoding matrix, and a $PMI_H$ is a PMI determined based on the first horizontal component precoding matrix. The CSI calculation processing unit 21 determines a CQI of each code word assuming the determined RI and PMI. Here, a code word is a unit of a coding bit string related to data transmitted in the PDSCH, and data transmitted in one subframe is divided into two code words at most according to the rank.

The CSI calculation processing unit 21 then outputs the calculated first channel state information, that is, the RI, CQI, and PMI, to the report control unit 17. Further, the CSI calculation processing unit 21 outputs the selected vertical component precoding matrix to the CSI calculation processing unit 22.

The CSI calculation processing unit 22 determines a second horizontal component precoding matrix, by using the calculated channel estimate value and the vertical component precoding matrix received from the CSI calculation processing unit 21. The second horizontal component precoding matrix is a horizontal component precoding matrix in the precoding matrix for MU-MIMO. As the vertical component precoding matrix in the precoding matrix for MU-MIMO, the same one as the vertical component precoding matrix in the precoding matrix for SU-MIMO is used.

The CSI calculation processing unit 22 then determines, based on the determined second horizontal component precoding matrix, a $PMI_H'$. The CSI calculation processing unit 22 then outputs the calculated second channel state information, that is, the $PMI_H'$, to the report control unit 17.

The report control unit 17 reports the first channel state information to the later described base station 30, by outputting the first channel state information to the uplink control signal generating unit 18 at a report timing of the first channel state information. That is, the report control unit 17 reports the RI, CQI, and PMI ($PMI_V$ and $PMI_H$) for SU-MIMO at the report timing of the first channel state information, to the later described base station 30.

Further, the report control unit 17 reports the second channel state information to the later described base station 30 by outputting the second channel state information to the uplink control signal generating unit 18 at a report timing of the second channel state information. That is, the report control unit 17 reports the $PMI_H'$ for MU-MIMO to the later described base station 30 at the report timing of the second channel state information. Herein, the $PMI_V$ is reported as the first channel state information to the later described base station 30 but limitation is not made thereto. The $PMI_V$ may be reported as the second channel state information to the later described base station 30 since the $PMI_V$ is common to both SU-MIMO and MU-MIMO.

The uplink control signal generating unit 18 performs error correction coding, data modulation, and the like, with respect to channel state information of a cell connected to the mobile station 10, that is, control information including the above described first channel state information or second channel state information.

The IFFT unit 19 executes IFFT processing and adds a CP, with respect to a signal transmitted to the later described base station 30.

The transmitting RF unit 20 performs, with respect to a signal to be transmitted, digital to analog (D/A) conversion, quadrature modulation, and conversion from a base band to a radio frequency.

[Example of Configuration of Base Station]

Figure 3:
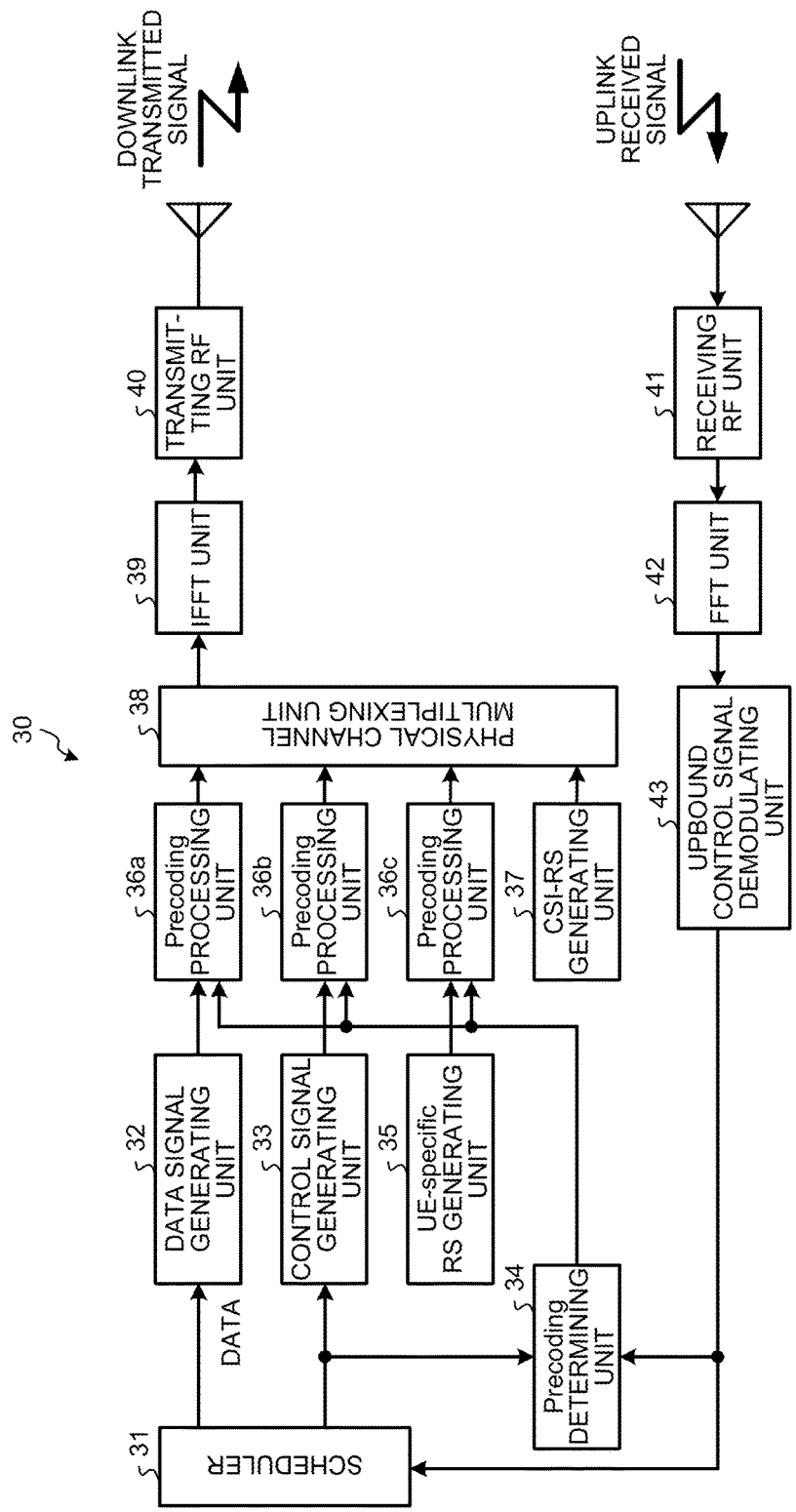
FIG. 3 is a block diagram illustrating an example of a base station of the first embodiment.

FIG. 3 is a block diagram illustrating an example of the base station of the first embodiment. In FIG. 3, the base station 30 has a scheduler 31, a data signal generating unit 32, a control signal generating unit 33, a precoding determining unit 34, a UE-specific RS generating unit 35, and precoding processing units 36a, 36b, and 36c. Further, the base station 30 has a CSI-RS generating unit 37, a physical channel multiplexing unit 38, an IFFT unit 39, a transmitting RF unit 40, a receiving RF unit 41, an FFT unit 42, and an uplink control signal demodulating unit 43. Furthermore, the base station 30 has two-dimensional array arrangement multiple antennas (not illustrated). Each of these units is connected to be able to input and output signals and data unidirectionally or bidirectionally.

The scheduler 31 performs scheduling with respect to each mobile station connected to the base station 30. For example, the scheduler 31 assigns wireless resources (time, frequency, and the like) to each mobile station. Further, the scheduler 31 determines a MIMO system (that is, SU-MIMO or MU-MIMO) to be applied to each wireless resource. Furthermore, the scheduler 31 selects a transmission format (for example, a transmission rank to be applied, or the like).

The data signal generating unit 32 performs error correction coding and data modulation, with respect to data input from the scheduler 31.

The control signal generating unit 33 performs error correction coding and data modulation, with respect to control information including transmission format information, such as a transmission rank to be applied.

The precoding determining unit 34 determines, based on the first channel state information and second channel state information reported from the mobile station 10, a precoding matrix for SU-MIMO, a precoding matrix for MU-MIMO, and a precoding matrix for EPDCCH.

For example, the precoding determining unit 34 determines, based on the PMI ($PMI_V$ and $PMI_H$) included in the first channel state information, the precoding matrix for SU-MIMO. The precoding determining unit 34 then outputs the determined precoding matrix for SU-MIMO to the precoding processing units 36a and 36c.

Further, the precoding determining unit 34 determines, based on the $PMI_H'$ included in the second channel state information and the $PMI_V$ included in the first channel state information, the precoding matrix for MU-MIMO and the precoding matrix for EPDCCH. The precoding determining unit 34 then outputs the precoding matrix for MU-MIMO to the precoding processing units 36a and 36c. Further, the precoding determining unit 34 outputs the precoding matrix for EPDCCH to the precoding processing units 36b and 36c.

The UE-specific RS generating unit 35 generates the above described UE-specific RS.

Each of the precoding processing units 36a, 36b, and 36c executes precoding processing, based on each precoding matrix input from the precoding determining unit 34.

The CSI-RS generating unit 37 generates the above described CSI-RS.

The physical channel multiplexing unit 38 performs frequency multiplexing on each physical channel.

The IFFT unit 39 executes IFFT processing and adds a CP, with respect to a signal transmitted to the mobile station 10.

The transmitting RF unit 40 performs D/A conversion, quadrature modulation, and conversion from a base band to a radio frequency, with respect to a signal to be transmitted.

The receiving RF unit 41 performs conversion from a radio frequency to a base band, quadrature demodulation, and A/D conversion, with respect to a signal received from the mobile station 10.

The FFT unit 42 performs detection of an FFT timing, removal of a CP, and FFT processing, with respect to a signal received from the receiving RF unit 41.

The uplink control signal demodulating unit 43 extracts a control signal and an uplink DM-RS from a received signal that has been FFT processed and performs channel compensation by using a channel estimate value obtained from the extracted DM-RS. Further, the uplink control signal demodulating unit 43 restores the first channel state information and the second channel state information reported from the mobile station 10 as the above described control information, by performing data demodulation and error correction decoding.

[Example of Operation of Mobile Station and Base Station]

Figure 4:
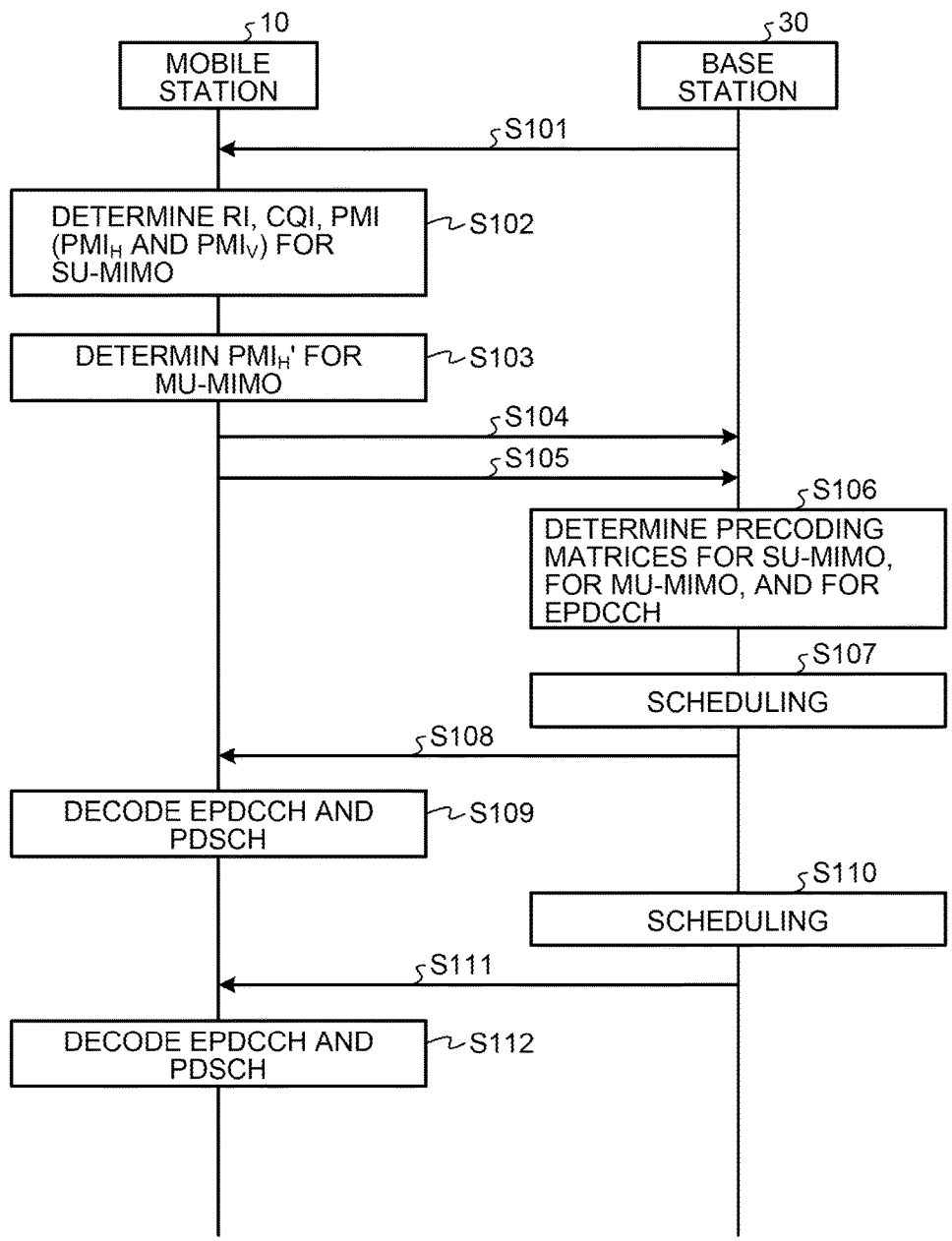
FIG. 4 is a sequence diagram provided for description of an example of processing operation of the mobile station and base station of the first embodiment.

An example of processing operation of the mobile station 10 and base station 30 having the above configurations will be described. FIG. 4 is a sequence diagram provided for description of the example of the processing operation of the mobile station and base station of the first embodiment.

The base station 30 transmits a CSI-RS generated by the CSI-RS generating unit 37 (Step S101) and the mobile station 10 receives the CSI-RS.

In the mobile station 10, the CSI calculating unit 14 determines an RI, a CQI, and a PMI (a $PMI_V$ and a $PMI_H$) for SU-MIMO, by using the received CSI-RS (Step S102).

Further, the CSI calculating unit 14 determines a $PMI_H'$ for MU-MIMO by using the received CSI-RS and the $PMI_V$ determined in Step S102 (Step S103). The determination of the PMIs in Step S102 and Step S103 will be described in detail later.

The report control unit 17 then reports the first channel state information, that is, the RI, CQI, and PMI ($PMI_V$ and $PMI_H$), at the report timing of the first channel state information, to the base station 30 (Step S104). This reporting of the first channel state information is performed by a CSI process #1.

Further, the report control unit 17 reports the second channel state information, that is, the $PMI_H'$, at the report timing of the second channel state information, to the base station 30 (Step S105). This reporting of the second channel state information is performed by a CSI process #2.

In the base station 30, the precoding determining unit 34 determines, based on the first channel state information and second channel state information reported from the mobile station 10, a precoding matrix for SU-MIMO, a precoding matrix for MU-MIMO, and a precoding matrix for EPDCCH (Step S106).

The scheduler 31 performs scheduling with respect to the mobile station 10 (Step S107). Herein, it is assumed that SU-MIMO is applied to the PDSCH assigned to the mobile station 10.

The precoding processing units 36a and 36c apply the precoding matrix for SU-MIMO determined in Step S106 to a UE-specific RS used in demodulation of the PDSCH and PDSCH. Further, the precoding processing units 36b and 36c apply the precoding matrix for EPDCCH determined in Step S106 to a UE-specific RS used in demodulation of the EPDCCH and EPDCCH. The transmitting RF unit 40 then transmits the PDSCH, UE-specific RS, and EPDCCH, to which the corresponding precoding matrices have been applied by the precoding processing units 36a, 36b, and 36c, to the mobile station 10 (Step S108).

In the mobile station 10, the channel estimating unit 13 performs channel estimation based on the UE-specific RS transmitted in Step S108. The control signal demodulating unit 15 and data signal demodulating unit 16 decode the PDSCH and EPDCCH, based on the channel estimate value obtained by the channel estimating unit 13, respectively (Step S109).

Further, the scheduler 31 performs scheduling with respect to the mobile station 10 (Step S110). Herein, it is assumed that MU-MIMO has been determined to be applied to the PDSCH assigned to the mobile station 10.

The precoding processing units 36a and 36c apply the precoding matrix for MU-MIMO determined in Step S106, to the PDSCH and UE-specific RS used in demodulation of the PDSCH. Further, the precoding processing units 36b and 36c apply the precoding matrix for EPDCCH determined in Step S106, to the EPDCCH and the UE-specific RS used in demodulation of the EPDCCH. The transmitting RF unit 40 then transmits the PDSCH, UE-specific RS, and EPDCCH, to which the corresponding precoding matrices have been applied by the precoding processing units 36a, 36b, and 36c, to the mobile station 10 (Step S111).

In the mobile station 10, the channel estimating unit 13 performs, based on the UE-specific RS transmitted in Step S111, channel estimation. The control signal demodulating unit 15 and data signal demodulating unit 16 decode, based on the channel estimate value obtained by the channel estimating unit 13, the PDSCH and EPDCCH, respectively (Step S112).

Next, a specific example of determination of PMIs in the mobile station will be described.

Figure 5:
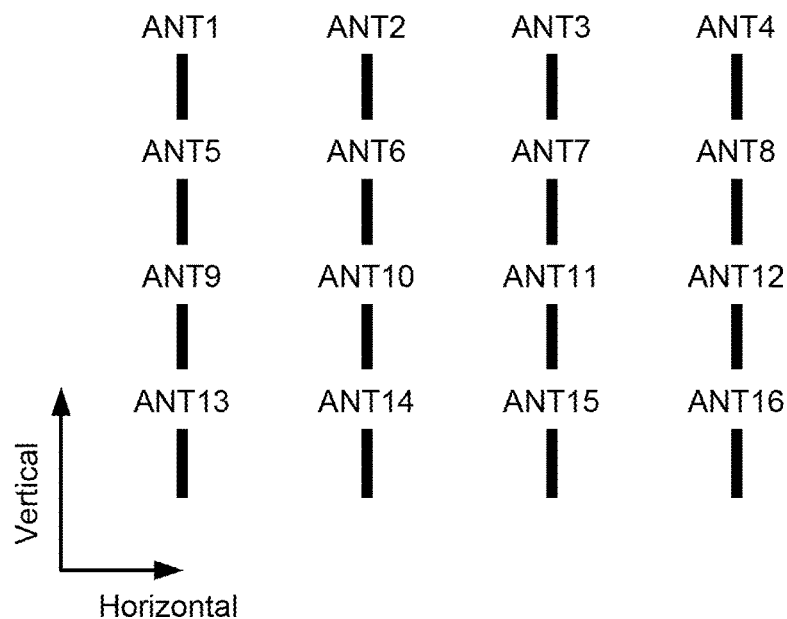
FIG. 5 is a diagram illustrating an example of two-dimensional array arrangement multiple antennas.

First, presuppositions of precoding in the base station 30 will be described. As described above, the base station 30 has the two-dimensional array arrangement multiple antennas. For example, the base station 30 has two-dimensional array arrangement multiple antennas as illustrated in FIG. 5. FIG. 5 is a diagram illustrating an example of the two-dimensional array arrangement multiple antennas. In FIG. 5, a total of 4×4=16 antennas are illustrated. Hereinafter, an antenna set of the two-dimensional array arrangement multiple antennas may be simply referred to as "antenna set".

Figure 6:
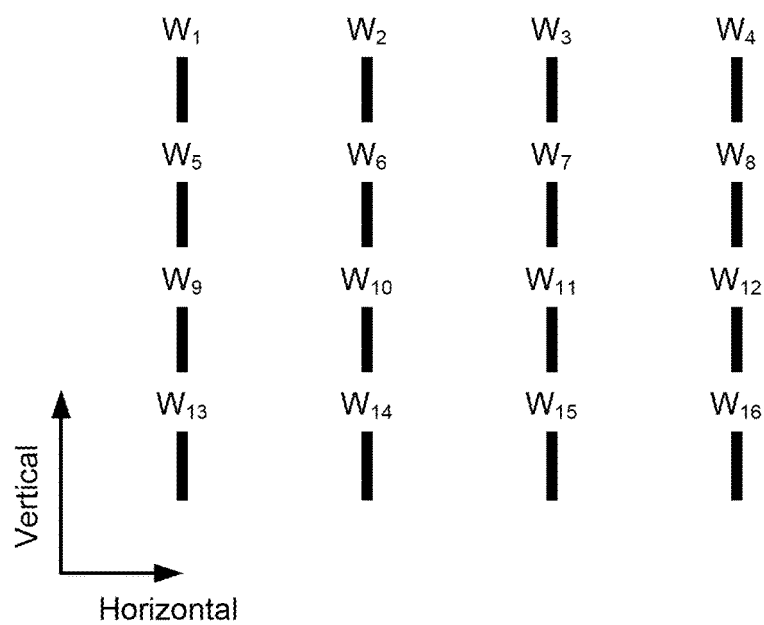
FIG. 6 is a diagram provided for description of a precoding matrix W.

In the base station 30, when precoding is performed, a precoding matrix W is used, the precoding matrix W having, as an element, a weight corresponding to each antenna included in the antenna set. For example, as illustrated in FIG. 6, the precoding matrix W, which has weights $W_1$ to $W_{16}$ as elements corresponding to antennas ANT1 to ANT16, is used. FIG. 6 is a diagram provided for description of the precoding matrix W.

Further, the precoding matrix W is able to be separated into a horizontal component precoding matrix $W_H$ and a vertical component precoding matrix $W_V$. The horizontal component precoding matrix $W_H$ is common to all of first type groups resulting from horizontal direction grouping of the antennas included in the antenna set. In the example of FIG. 5, the antennas ANT1 to ANT4 correspond to one first type group, the antennas ANT5 to ANT8 correspond to one first type group, the antennas ANT9 to ANT12 correspond to one first type group, and the antennas ANT13 to ANT16 correspond to one first type group. Further, the vertical component precoding matrix $W_V$ is common to all of second type groups resulting from vertical direction grouping of the antennas included in the antenna set. In the example of FIG. 5, the antennas ANT1, ANT5, ANT9, and ANT13 correspond to one second type group, the antennas ANT2, ANT6, ANT10, and ANT14 correspond to one second type group, the antennas ANT3, ANT7, ANT11, and ANT15 correspond to one second type group, and the antennas ANT4, ANT8, ANT12, and ANT16 correspond to one second type group.

Figures 7, 8:
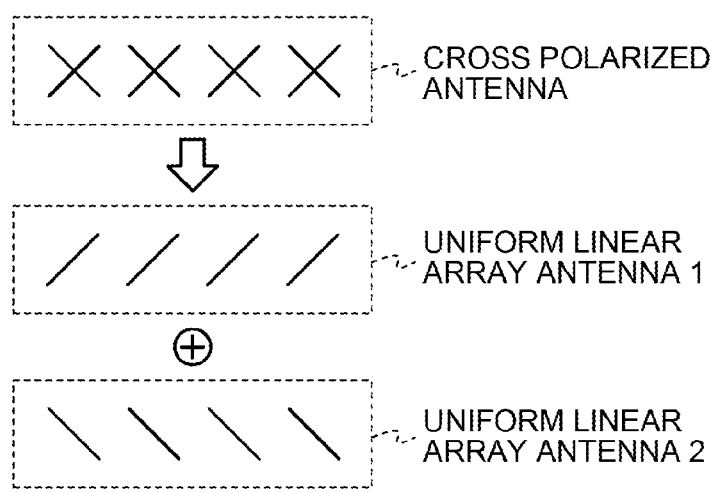
FIG. 7 is a diagram provided for description of the precoding matrix W.
FIG. 8 is a diagram illustrating an example of a cross polarized antenna.

That is, if the horizontal component precoding matrix $W_H$ is expressed as $W_H = [W_{h1}, W_{h2}, W_{h3}, W_{h4}]^T$, and the vertical component precoding matrix $W_V$ is expressed as $W_v=[W_{v1}, W_{v2}, W_{v3}, W_{v4}]^T$, the precoding matrix W is expressed in a form illustrated in FIG. 7. FIG. 7 is a diagram provided for description of the precoding matrix W. Herein, T represents a transposed matrix. That is, the precoding matrix W is obtained by multiplying the horizontal component precoding matrix $W_H$ by the vertical component precoding matrix $W_V$. The precoding matrix W illustrated in FIG. 7 is that in a case where the number of spatial layers is one, and in a case where the number of spatial layers is equal to or greater than two, a matrix having plural element strings is obtained.

When the number of spatial layers is equal to or greater than two and there are plural element strings, the vertical component precoding matrix $W_V$ is common to all of the plural element strings and only the horizontal component precoding matrix $W_H$ differs among the element strings. This is because roles of horizontal direction beams and vertical direction beams are set as follows. That is, for horizontal direction beams, as conventionally done, spatial multiplexing of data streams and directivity formation are adaptively applied. In other words, the horizontal direction beams and communication ranks differ depending on the MIMO system, physical channel, and the like. In contrast, the vertical direction beams are caused to have sharp directivity. That is, the vertical direction beams are common regardless of the MIMO system, physical channel, and the like.

Further, the horizontal component precoding matrix $W_H$ is able to be divided into two elements. For example, a case will be considered, where each of the first type groups is a cross polarized antenna as illustrated by the top diagram in FIG. 8. FIG. 8 is a diagram illustrating an example of the cross polarized antenna. The cross polarized antenna is able to be divided into two uniform linear array antennas. The horizontal component precoding matrix $W_H$ is able to be divided into a matrix element $W_{H1}$ and a matrix element $W_{H2}$. The matrix element $W_{H1}$ provides a phase difference between antennas in the uniform linear array antenna. Further, the matrix element $W_{H1}$ influences directivity formation. In contrast, the matrix element $W_{H2}$ provides a phase difference between the uniform linear array antennas. Therefore, the matrix element $W_{H1}$ has smaller variation with respect to time and frequency than the matrix element $W_{H2}$. That is, the matrix element $W_{H1}$ targets wide band and long term channel characteristics, and the matrix element $W_{H2}$ targets frequency selective and short term channel characteristics.

Premised on the above, in the mobile station 10, the CSI calculating unit 14 determines PMIs. Hereinafter, two specific examples of a method of determining PMIs will be described.

<First Specific Example>

First, the CSI calculating unit 14 determines a PMI for SU-MIMO.

That is, the CSI calculating unit 14 fixes the matrix element $W_{H2}$, to one of plural candidates for the matrix element The CSI calculating unit 14 then determines a combination that maximizes communication capacity of the whole system bandwidth, from plural candidates for a combination of the vertical component precoding matrix $W_V$ and the matrix element $W_{H1}$, in a state where the matrix element $W_{H2}$ has been fixed.

The CSI calculating unit 14 then determines a matrix element by which communication capacity is maximized, for each subband, from the plural candidates for the matrix element $W_{H2}$, in a state where the determined combination has been fixed.

Next, the CSI calculating unit 14 determines a PMI for MU-MIMO.

That is, the CSI calculating unit 14 uses the one determined for SU-MIMO with respect to the vertical component precoding matrix $W_V$.

The CSI calculating unit 14 then fixes the matrix element $W_{H2}'$ to one of plural candidates for the matrix element $W_{H2}'$.

The CSI calculating unit 14 then determines the matrix element $W_{H1}'$ that maximizes the communication capacity of the whole system bandwidth, from plural candidates for the matrix element $W_{H1}'$, in a state where the fixed matrix element $W_{H2}'$ and the above described vertical component precoding matrix $W_V$ have been fixed.

The CSI calculating unit 14 then determines the matrix element $W_{H2}'$ by which communication capacity is maximized, for each subband, in a state where the determined matrix element $W_{H1}'$ and the above described vertical component precoding matrix $W_V$ have been fixed.

From the above, the PMI for SU-MIMO, that is, the $PMI_V$ and $PMI_H$ (that is, the $W_{H1}$ and $W_{H2}$), and the PMI for MU-MIMO, that is, the $PMI_{H}'$ (that is, the $W_{H1}'$ and $W_{H2}'$) are able to be determined.

The above described determination of the combinations may be performed as follows also. That is, the CSI calculating unit 14 calculates communication capacities of the whole system bandwidth for all of combinations of: respective candidates for a combination of the vertical component precoding matrix $W_V$ and matrix element $W_{H1}$; and respective candidates for the matrix element $W_{H2}$. The CSI calculating unit 14 then totalizes the calculated communication capacities for the respective candidates for the combination of the vertical component precoding matrix $W_V$ and matrix element $W_{H1}$, and determines a combination for which a value of the total becomes maximum.

<Second Specific Example>

In a second specific example, determination of a PMI for SU-MIMO is the same as that for the first specific example. However, determination of a PMI for MU-MIMO in the second specific example is different from that for the first specific example.

That is, the CSI calculating unit 14 uses the vertical component precoding matrix $W_V$ and matrix element $W_{H1}$ determined for SU-MIMO.

The CSI calculating unit 14 determines the matrix element $W_{H2}'$ for which communication capacity becomes maximum, for each subband, in a state where the vertical component precoding matrix $W_V$ and matrix element $W_{H1}$ have been fixed.

As described above, according to this embodiment, in the mobile station 10, the CSI calculating unit 14 calculates first precoding information (for example, the $PMI_H$) corresponding to the first channel state information and used in horizontal direction beam formation in the base station 30, and second precoding information (for example, the $PMI_H'$) corresponding to the second channel state information. Further, the CSI calculating unit 14 calculates third precoding information (for example, the $PMI_V$) corresponding to both of the first channel state information and second channel state information and used in vertical direction beam formation in the base station. The report control unit 17 then reports the first precoding information and third precoding information in reporting the first channel state information (for example, in the CSI process #1); and does not report the third precoding information and reports the second precoding information, in reporting the second channel state information (for example, in the CSI process #2).

By this configuration of the mobile station 10, the third precoding information common to the first channel state information and second channel information is able to be reported in any of: reporting the first channel state information; and reporting the second channel state information. Thereby, overhead of control information is able to be reduced.

[Other Embodiments]

[1] In the first embodiment, each antenna has been described as a physical antenna, but the disclosed technique is similarly applicable to a logical antenna, such as an antenna port.

[2] In the embodiment, the EPDCCH and PDSCH have been exemplified as physical channels to which the precoding is applied. However, the EPDCCH may be another control channel, such as a physical downlink control channel (PDCCH) or a physical control format indicator channel (PCFICH). Further, the PDSCH may be another data channel.

[3] Respective elements of each unit illustrated in the first embodiment are not necessarily configured physically as illustrated in the drawings. That is, a specific mode of separation and integration of the respective units is not limited to those illustrated in the drawings, and all or a part thereof may be configured to be functionally or physically separated or integrated in arbitrary units depending on various loads, use situations, and the like.

In addition, all or any part of various processing functions executed in the respective devices may be executed on a central processing unit (CPU) (or a micro computer, such as a micro processing unit (MPU) or a micro controller unit (MCU)). Further, all or any part of the various processing functions may be executed on a program analyzed and executed by a CPU (or a micro computer, such as an MPU or MCU) or on hardware by wired logic.

The mobile station and base station of the first embodiment may be realized by the following hardware configuration, for example.

Figure 9:
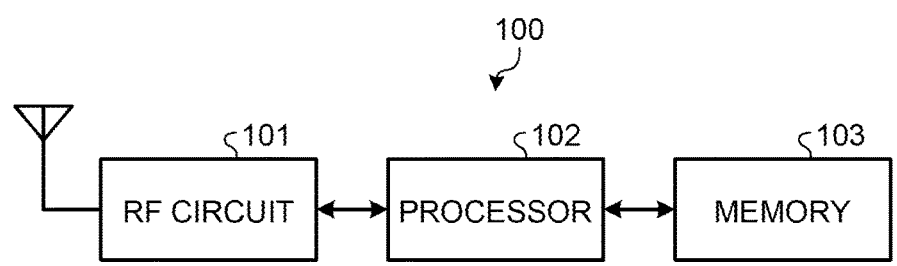
FIG. 9 is a diagram illustrating a hardware configuration of the mobile station.

FIG. 9 is a diagram illustrating an example of a hardware configuration of the mobile station. As illustrated in FIG. 9, a mobile station 100 has a radio frequency (RF) circuit 101, a processor 102, and a memory 103.

Examples of the processor 102 include a central processing unit(CPU), a digital signal processor (DSP), a field programmable gate array (FPGA), and the like. Further, examples of the memory 103 include: a random access memory (RAM), such as a synchronous dynamic random access memory (SDRAM); a read only memory (ROM); a flash memory; and the like.

Various processing functions executed in the mobile station of the first embodiment may be realized by a processor included in an amplifying device executing programs stored in various memories, such as non-volatile storage media. That is, programs corresponding to respective processes executed by the FFT unit 12, the channel estimating unit 13, the CSI calculating unit 14, the control signal demodulating unit 15, the data signal demodulating unit 16, the report control unit 17, the uplink control signal generating unit 18, and the IFFT unit 19 may be recorded in the memory 103, and each program may be executed by the processor 102. Further, the respective processes executed by the FFT unit 12, the channel estimating unit 13, the CSI calculating unit 14, the control signal demodulating unit 15, the data signal demodulating unit 16, the report control unit 17, the uplink control signal generating unit 18, and the IFFT unit 19 may be executed by being shared by plural processors, such as a baseband CPU and an application CPU. Furthermore, the receiving RF unit 11 and the transmitting RF unit 20 are realized by the RF circuit 101.

Figure 10:
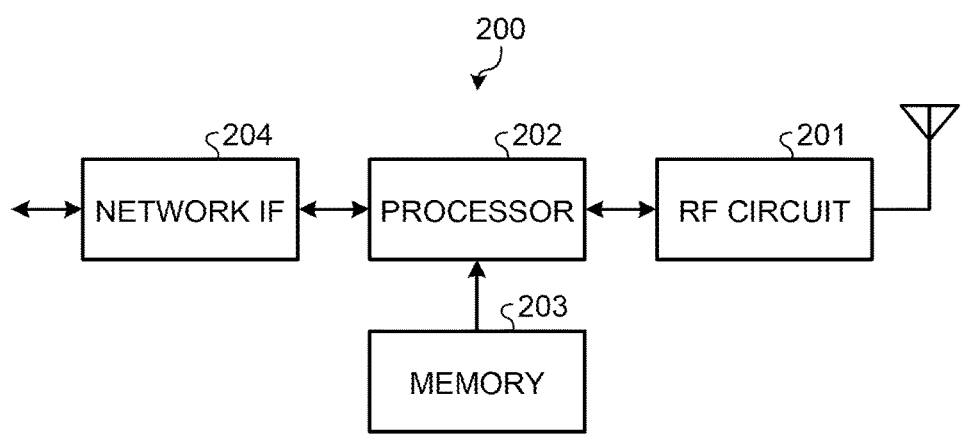
FIG. 10 is a diagram illustrating a hardware configuration of the base station.

FIG. 10 is a diagram illustrating an example of a hardware configuration of the base station. As illustrated in FIG. 10, a base station 200 has an RF circuit 201, a processor 202, a memory 203, and a network IF (Inter Face) 204. Examples of the processor 202 include a CPU, a DSP, an FPGA, and the like. Further, examples of the memory 203 include: a RAM, such as an SDRAM; a ROM; a flash memory; and the like.

The various processing functions performed in the base station of the first embodiment may be realized by a processor included in an amplifying device executing programs stored in various memories, such as non-volatile storage media. That is, programs corresponding to the respective processes executed by the scheduler 31, the data signal generating unit 32, the control signal generating unit 33, the precoding determining unit 34, the UE-specific RS generating unit 35, a precoding processing unit 36, the CSI-RS generating unit 37, the physical channel multiplexing unit 38, the IFFT unit 39, the FFT unit 42, and the uplink control signal demodulating unit 43 may be recorded in the memory 203, and each program may be executed by the processor 202. Furthermore, the transmitting RF unit 40 and the receiving RF unit 41 are realized by the RF circuit 201.

Although the base station 200 has been described as an integrated device, limitation is not made thereto. For example, the base station 200 may be configured of two separate devices, which are a wireless device and a control device. In this case, for example, the RF circuit 201 is installed in the wireless device, and the processor 202, memory 203, and network IF 204 are installed in the control device.

According to the disclosed aspects, overhead of control information is able to be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A mobile station that reports, based on a known signal transmitted from a base station, channel state information to the base station and performs wireless communication with the base station by spatial multiplexing, the mobile station comprising:
a memory; and
a processor coupled to the memory, wherein
the processor executes a process comprising:
calculating first precoding information corresponding to first channel state information and used in horizontal direction beam formation in the base station, second precoding information corresponding to second channel state information and used in horizontal direction beam formation in the base station, and third precoding information corresponding to both of the first channel state information and the second channel state information and used in vertical direction beam formation in the base station; and reporting the first precoding information and the third precoding information in reporting the first channel state information, and reports the second precoding information without reporting the third precoding information in reporting the second channel state information.

2. The mobile station according to claim 1, wherein one of the first channel state information and the second channel state information is used in spatial multiplexing for a single mobile station, and the other one of the first channel state information and the second channel state information is used in spatial multiplexing for a plurality of mobile stations.

3. The mobile station according to claim 1, wherein
the base station includes a plurality of antennas arranged two-dimensionally,
each of the first precoding information and the second precoding information is common to all of plural first type groups resulting from grouping of the plurality of antennas, and
the third precoding information is common to all of plural second type groups resulting from grouping of the plurality of antennas.

4. The mobile station according to claim 3, wherein
each of the first type groups is a group resulting from grouping, in a horizontal direction, of the plurality of antennas, and
each of the second type groups is a group resulting from grouping, in a vertical direction, of the plurality of antennas.

5. The mobile station according to claim 1, wherein the first channel state information and the second channel state information are used in different physical channels.

6. The mobile station according to claim 1, wherein one of the first channel state information and the second channel state information is used in a shared channel, and the other one is used in a control channel.

7. A reporting method for channel state information by a mobile station that performs wireless communication with a base station by spatial multiplexing, the reporting method comprising:
calculating first precoding information corresponding to first channel state information and used in horizontal direction beam formation in the base station, second precoding information corresponding to second channel state information and used in horizontal direction beam formation in the base station, and third precoding information corresponding to both of the first channel state information and the second channel state information and used in vertical direction beam formation in the base station; and
reporting the first precoding information and the third precoding information in reporting of the first channel state information, and reporting the second precoding information without reporting the third precoding information in reporting of the second channel state information.

* * * * *